Jan. 12, 1926.

H. P. EANES

1,569,730

TYING-IN MACHINE

Filed Oct. 24, 1922   10 Sheets-Sheet 3

INVENTOR.
Hugh P. Eanes
BY
Vernon E. Hodges
ATTORNEY

Jan. 12, 1926.

H. P. EANES 1,569,730

TYING-IN MACHINE

Filed Oct. 24, 1922

INVENTOR.
*Hugh P. Eanes*
BY
*Norman C. Hager*
ATTORNEYS.

Jan. 12, 1926.

H. P. EANES 1,569,730

TYING-IN MACHINE

Filed Oct. 24, 1922    10 Sheets-Sheet 8

Jan. 12, 1926.  H. P. EANES  1,569,730
TYING-IN MACHINE
Filed Oct. 24, 1922   10 Sheets—Sheet 10

Patented Jan. 12, 1926.

1,569,730

UNITED STATES PATENT OFFICE.

HUGH P. EANES, OF ASHEVILLE, NORTH CAROLINA, ASSIGNOR TO PARAMOUNT MACHINE CO., INC., OF ASHEVILLE, NORTH CAROLINA, A CORPORATION OF NORTH CAROLINA.

TYING-IN MACHINE.

Application filed October 24, 1922. Serial No. 596,548.

*To all whom it may concern:*

Be it known that I, HUGH P. EANES, a citizen of the United States, residing at Asheville, in the county of Buncombe and State of North Carolina, have invented certain new and useful Improvements in Tying-In Machines, of which the following is a specification.

My invention relates to an improvement in tying-in machines.

The object of the present invention is to provide a greatly simplified machine for automatically selecting threads and tying them together. Another object is to provide a machine of this character which will include a minimum number of co-operating elements which will not easily get out of order, which can be made and assembled and the entire machine produced at a greatly reduced expense as compared with others hitherto employed for the same work.

Another object is to provide a machine which will accurately select and tie the threads as they are successively separated and presented to the tying mechanism.

This invention includes mechanism which automatically moves forward step by step in accordance with the size of the threads to be tied, and a tying mechanism which receives the threads and ties them together.

The invention further consists in details and co-operative parts that will be fully hereinafter described and claimed.

In the accompanying drawings:—

Fig. 3 is an end view partly in section;

A, represents the bed of the machine, mounted on legs 1, which are braced apart by the rods 2.

Figure 12:
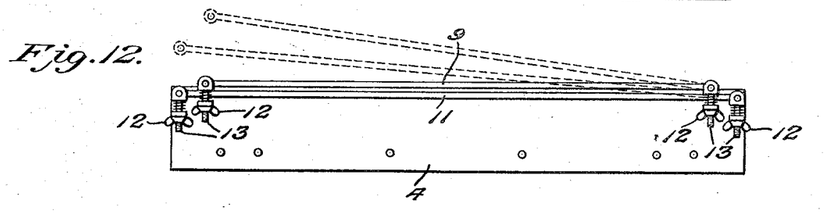
Fig. 12 is a side view of the rack for holding the threads.

The threads or yarn 3, 3', are combed over a rack consisting of plates 4 held by bolts 5 on opposite sides of the bed of the machine. The threads 3 are taken from the upper rollers 6, and threads 3' from the lower roller 6', and they are carried across to the rolls 7 and 7' respectively, thus making two rows of threads, one above another across the width of the rack. The upper threads are held down by the bars 8 and 9, and the lower rows of threads are held down in a lower plane by the bars 10 and 11 as viewed in Fig. 3. These bars 8 and 9, and 10 and 11, may be held in place under suitable tension by the wing-nuts 12 on the threaded bolts 13, as viewed in Figs. 3 and 12.

In this way, the required tension is given the threads or yarn, and furthermore in this way they are held in orderly and properly separated arrangement for successive selection in pairs by the selector and subsequent tying by the knotter, as will be fully explained.

Figure 11:
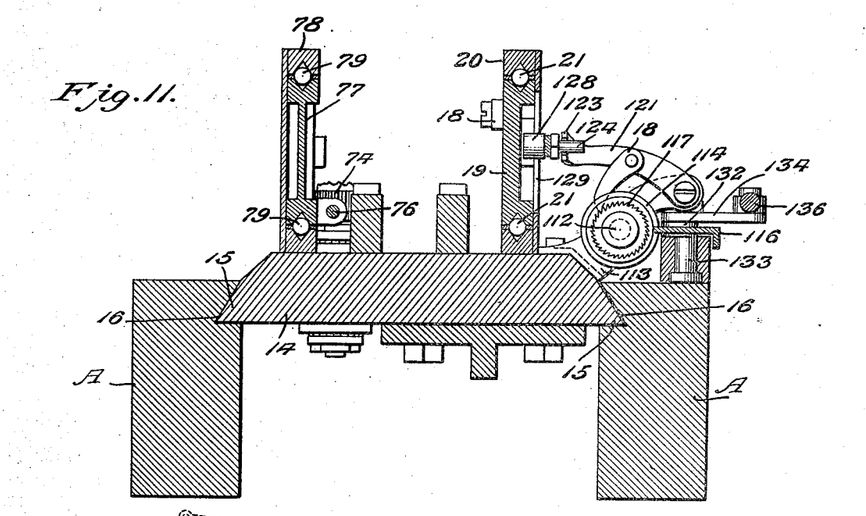
Fig. 11 is an enlarged transverse section through the machine.

A carriage 14 has parallel beveled opposite edges 15, which are fitted to slide in correspondingly-shaped grooves 16 in the inner walls of the sides of the plates 4, as shown in Figs. 3 and 11. On this carriage 14, the various working parts of the tying-in mechanism are carried.

Figure 4:
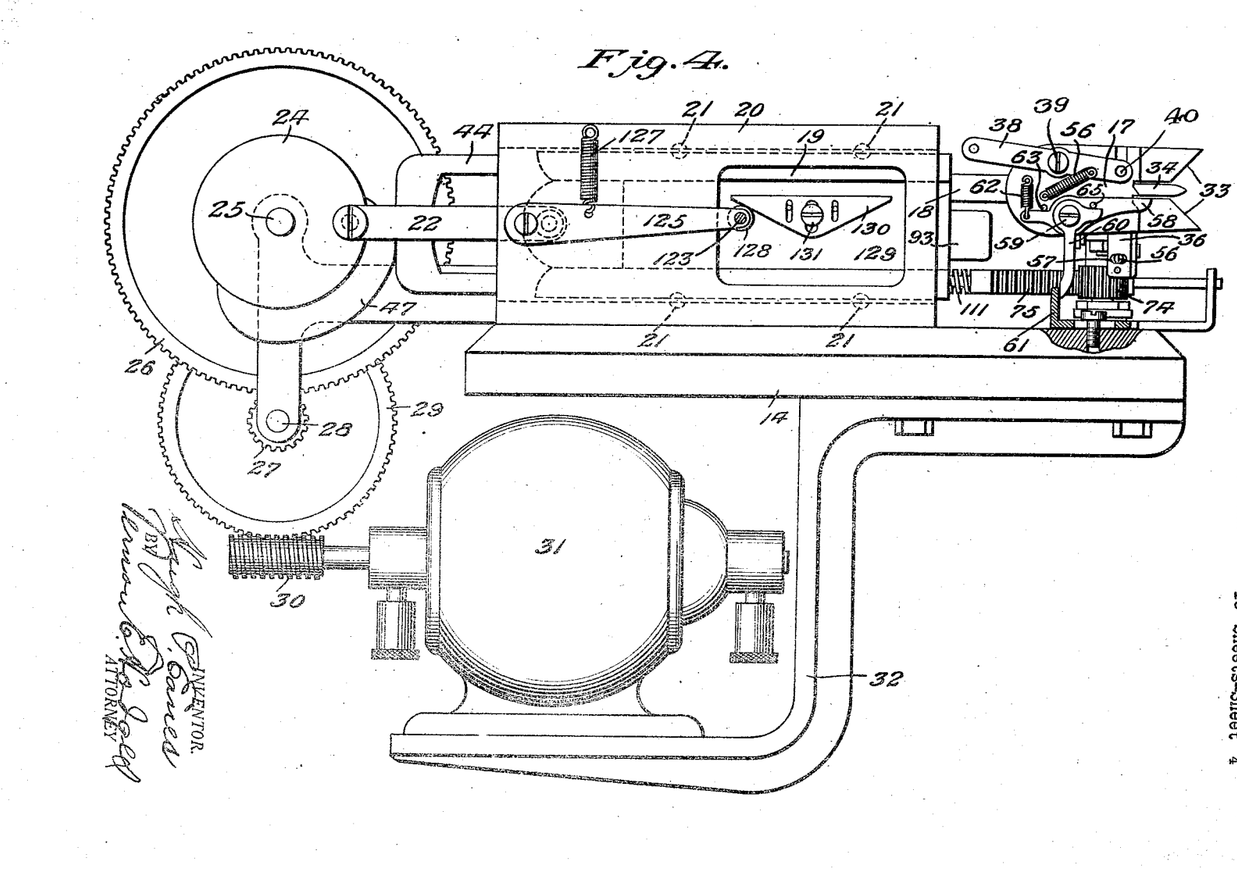
Fig. 4 is an enlarged side elevation of a portion of the mechanism as shown at the left in Fig. 1, and including the selector with mechanism for operating the same.
Figure 9:
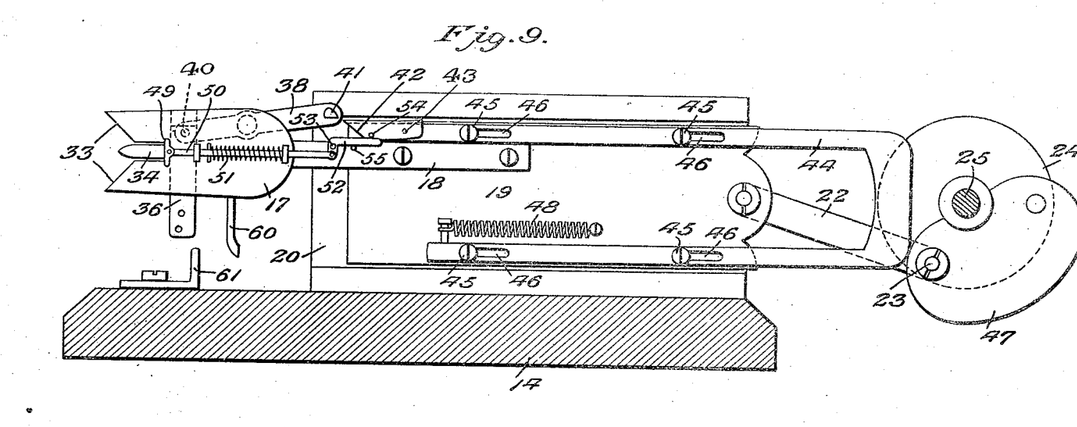
Fig. 9 is a longitudinal sectional view from the opposite side, and showing the selector with its operating mechanism, taken on line 9—9 of Fig. 5.
Figure 20:
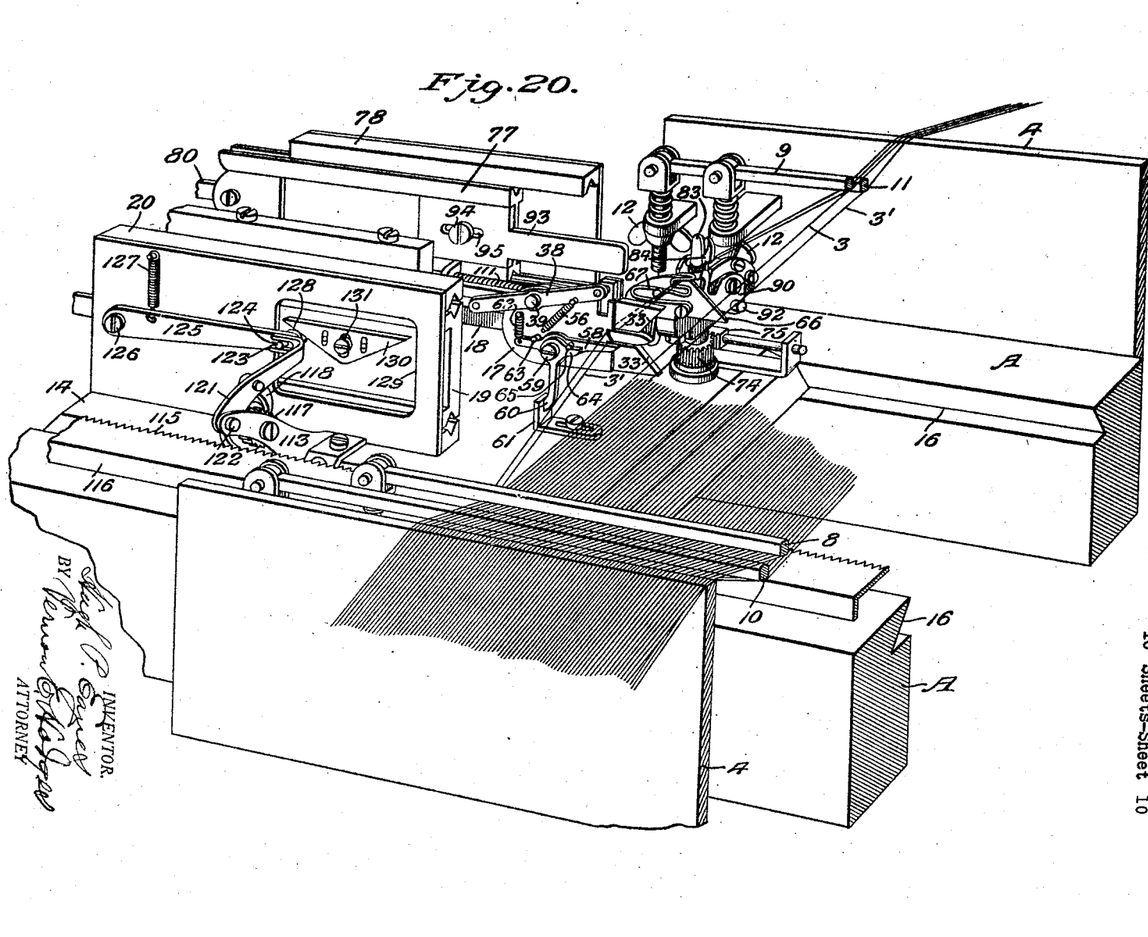
Fig. 20 is a view in perspective of the machine, one end being shown in crosssection, and the opposite end cut away.

A selector 17 shown in Figs. 1, 7, 9, 10 and 20 is carried on the outer end of an arm 18, which latter is bolted to the side of a slide 19, (see Figs. 9 and 20). This slide 19 is guided by, and held in sliding relation with, the slide-frame 20 by means of ballbearings 21 (see Fig. 11). The selector is arranged and adapted to be reciprocated in any approved manner, for instance through the connecting-rod 22 pivotally connected at one end to the slide, and at the other to the wrist-pin 23 on the disk 24 keyed on the rotary shaft 25. This shaft 25 is driven at a slow rate of speed by a large gear-wheel 26 keyed thereon, which receives its motion through a pinion 27 on the shaft 28. A worm-gear 29 keyed on the shaft 28 is driven by the worm 30 directly from the motor 31; and this motor 31 is conveniently mounted on a bracket 32 bolted to, and depending from, the lower side of the slide 14, as shown in Fig. 4.

Figure 7:
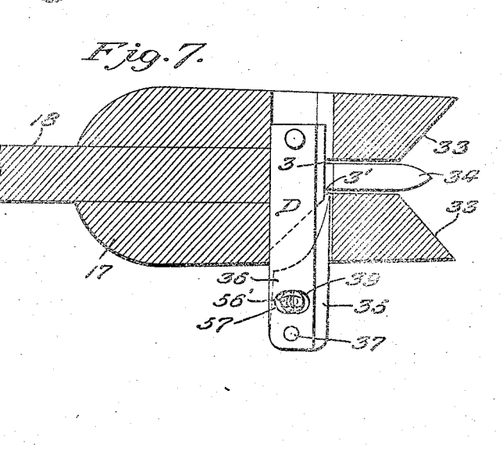
Fig. 7 is a vertical (enlarged) sectional view through the selector.
Figure 8:
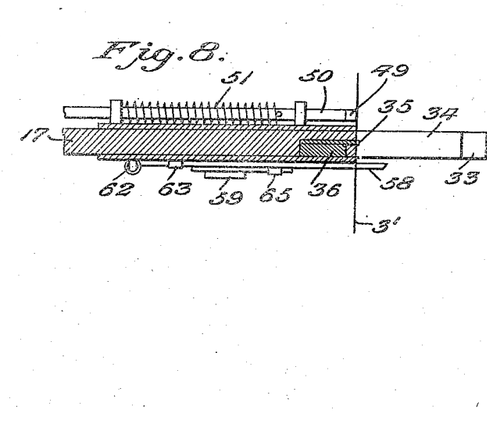
Fig. 8 is a horizontal section through the same.

The selector 17 has two jaws 33 which have inwardly-converging forward edges forming a mouth, and between them the tongue 34 is located, leaving a space on either side to receive the upper and lower threads 3 and 3' respectively, as viewed in enlarged form and in section in Fig. 7.

As the selector moves forward, the tongue 34 enters between the two horizontally disposed layers or rows of threads or yarn, keeping them apart, and receiving a thread both above and below the tongue, as shown in Figs. 7 and 20. As the selector moves forward, several threads enter the spaces in the throat of the selector between the tongue and the upper and lower edge. It is important that only one thread of each row be selected at a time. This may be accomplished in different ways. As a simple method of selecting these two threads, the selector-finger 35 is employed, as shown in enlarged detail in Fig. 7. This finger is connected to a bar 36 by pivot-pin 37, from which point as a center it may be adjusted to the right position. This bar 36 with the finger is controlled and actuated by a rocking-lever 38 fulcrumed on a stud 39 on the side of the selector 17, the forward end of the rocker-lever being connected with the bar 36 by a pivot-pin 40, and the opposite end being free but provided with an inwardly-projecting stud 41 of more or less triangular form (see Figs. 9 and 10). This stud 41 is in position to be engaged or passed by the bevel-ended cam 42, according to circumstances. The bevel-ended cam 42 is a grooved cam pivoted by the pin 43 to a wish-bone slide 44, which has limited sliding connection with the slide 19 by reason of the screws 45 extending through the slots 46. This wish-bone slide being held in contact with a cam 47 on the shaft 25 by a spring 48 secured to the slide 19 and the wish-bone slide 44 as shown in Fig. 9, and with each rotation of the cam 47 in contact with the adjacent end of the wish-bone slide the latter is forced forward a distance equivalent to the length of the slots 46.

Figure 10:
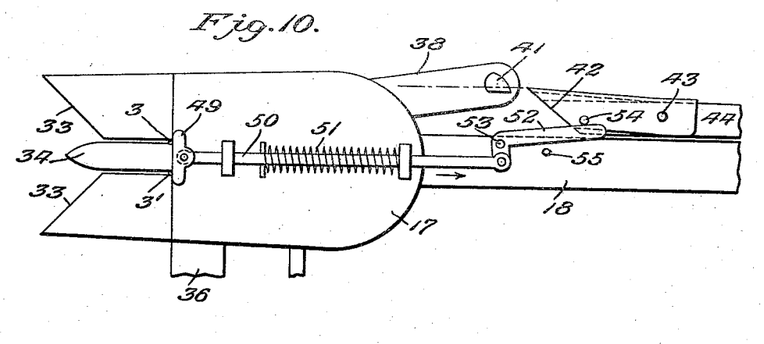
Fig. 10 is an enlarged view of the selector from the same side.

The position of the bevel-ended cam 42 is normally as shown in Fig. 9, where it drops by gravity, and in which position it would clear the triangular stud 41, which would mean the slide-bar 36 and the finger 35 would remain stationary. A trip 49 is pivoted on the forward end of a slide-rod 50 crossing the rear end of the spaces between the jaws and the tongue as shown in Figs. 9 and 10, and a delicate spring 51 normally forces this trip forward as shown in Fig. 9; but, with the forward movement of the selector, the tension of the first two threads 3 and 3' is sufficient to press equally on both ends of the trip 49, and to slide the rod 50 backward in the direction indicated by the arrow in Fig. 10, and, through the instrumentality of the bell-crank lever 52 pivoted at 53 on the bar 18, striking the pin 54 on the bevel-ended cam 42 to lift the point of the latter into the plane of the triangular stud 41, so that as the wish-bone slide 44 moves forward, the bevel face of this cam rides over the upper surface of the stud, thereby rocking the end of the lever 38, upon which the stud is located, down, and the opposite end with the bar 36 and the finger 35 up, to cause the finger to segregate the two adjacent threads 3 and 3' from the rest.

Should a single thread enter a set of two on one side of the tongue 34, instead of both sides, the trip 49 would merely tilt on its pivot without forcing the rod 50 back, as indicated by the arrow, and consequently the remaining parts would retain their normal position as shown in Fig. 9, and the selector would not function, or, in other words, the finger 35 would not move. This is important, as two threads are essential to the accomplishment of the purposes of the machine. A stop 55 beneath the bell-crank lever limits its downward movement, and a spring 56 returns the lever 38 and the connected parts to their normal position.

The position of the point of the selector-finger 35 is adjusted to the size of the thread or yarn, to insure against picking more than two threads, by means of the set-screw 56' operating in the elliptical countersunk slot 57 in the bar 36, as shown in Fig. 7.

Immediately upon the threads 3 and 3' being picked out from the other threads and held by the selector-finger 35, the selector is drawn back into the tension device, and within reach of the knotter as shown in Fig. 20, preparatory to the threads being tied together. When thus drawn, the knife-blade 58 is caused to shear against the side of the selector as shown in Fig. 20, thereby cutting the threads 3 and 3' at that point. The knife-blade 58 is pivotally mounted on a stud 59, and it is actuated by the stem 60 striking the stub 61 on the carriage 14. The knife-blade is normally held as shown in Fig. 20 against the pin 63 by the spring 62, and the lug 64 on the stem by striking a pin 65 on the knife-blade forces the latter upwardly, and after the selector is moved still further back, the stem 60 drags over the stub 61, and the spring 62 returns the knife-blade to the position shown in Fig. 20, where it is stopped by the pin 63, and the stem 60 is left free to ride over the top of the stub 61 when the selector again moves forward to choose the next two threads.

The tension device is composed of a plate 66 having an inclined forward edge up and over which the threads ride as shoved back by the selector, and as shown in Fig. 20, until caught and temporarily held by the spring tension 67, before the threads are cut by the blade 58, and while being tied together, and until the threads are again severed, at any point by the knot-tyer at the completion of the tying of the knot.

Figure 6:
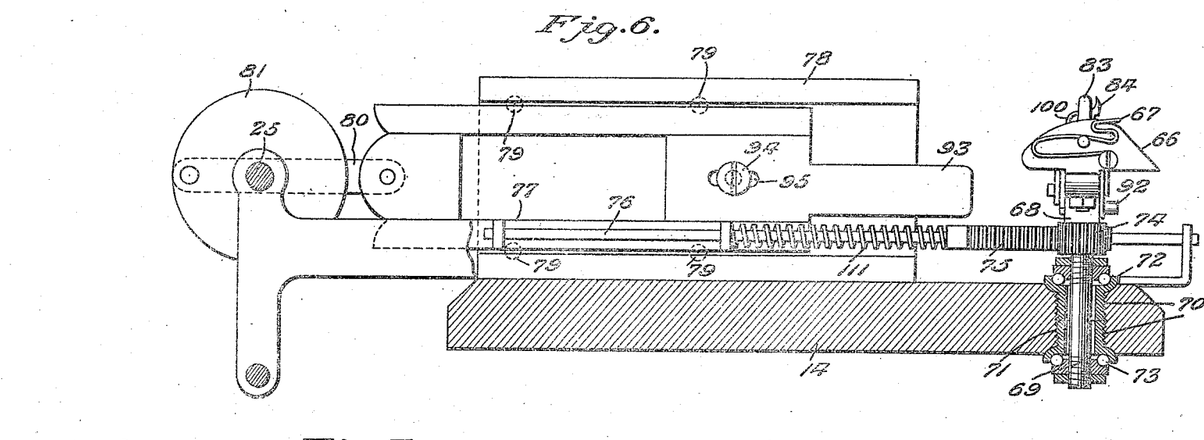
Fig. 6 is a detail, enlarged and partly in section showing the knotter from one side, taken on line 6—6 of Fig. 5.

The tension device and the knotter are carried on a head 68, the stem 69 of which extends through the bushings 70 screwed in opposite directions through a hole 71 in the carriage as shown in Fig. 6, cups 72 being formed at the ends of the bushings for the ball-bearings 73. A rocking pinion 74 keyed on the stem 69 is engaged by the teeth of the rack-bar 75, and the stem 76 of this rack-bar has sliding connection with the slide 77, which latter is guided in its movements in the slide-frame 78 by ball-bearings 79. This slide is operated by connecting-rod 80 extending from the crank-disk 81 keyed on the shaft 25.

The knotter is carried on the head 68. A post projects upwardly from the head 68, and is divided or slotted at its upper end to form a divided bill 83, as viewed in Figs. 13 to 18, and a tying-hook 84 is fitted in the space between the parts of the bill, between which it is guided as it swings upon its pivot 85.

Figures 13, 14, 15, 16, 17, 18, 19:
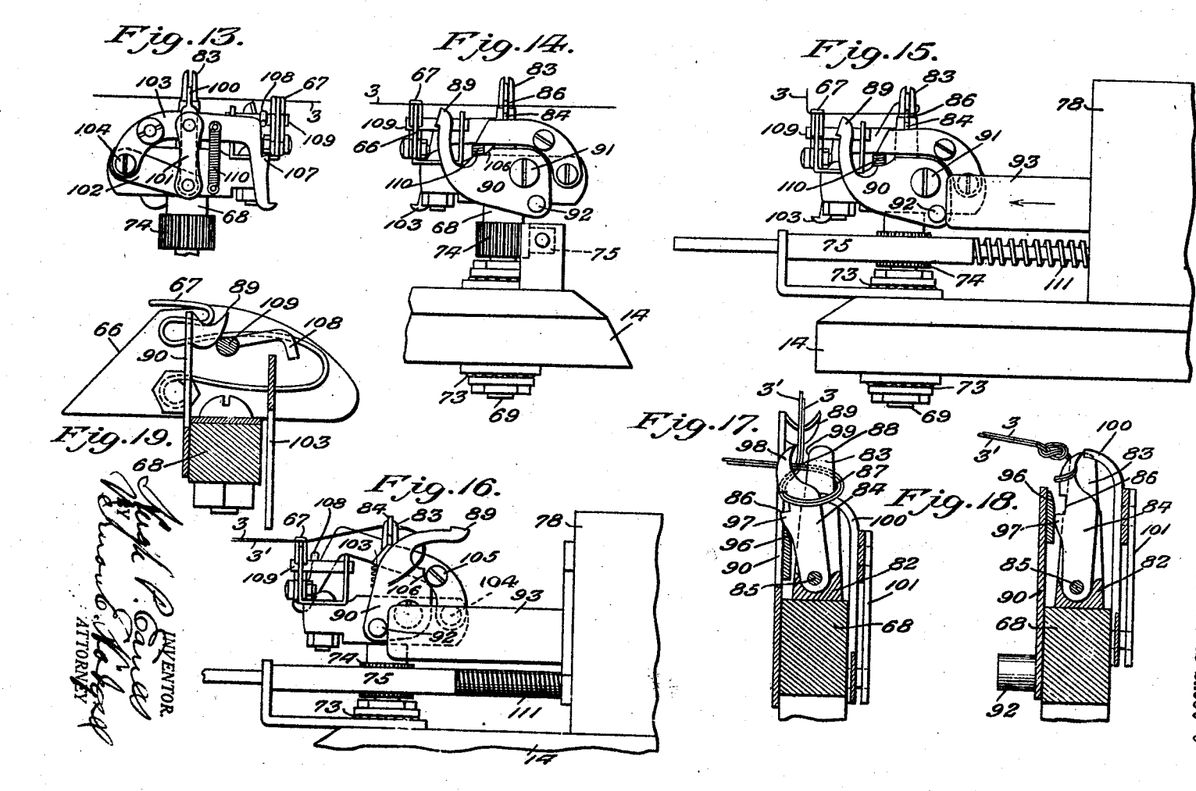
Figs. 13, 14, 15, 16, 17, 18 and 19 are different views of the knotter showing it in different positions in the process of the formation of the knot.

While the threads 3 and 3' are being held by the tension device in the position shown in Figs. 13 and 20, the head 68 is given about a three-quarters revolution to the point shown in Fig. 15, forming a loop in the threads around the bill, and into a notch 86 in the side of the tying hook with the threads crossed as shown in Fig. 17, where it is retained temporarily.

The severing of the threads by the knife-blade 58 is timed to occur just in advance of the rotation of the head 68, and by furnishing the slack required to form the loop 87 and the cross in the threads at the point 88 (as shown enlarged in Fig. 17) the tension device 67 keeps the threads taut and permits them to pull part way therethrough as required to form the knot.

A portion of the threads thus held taut by the knotter and the tension device is in the direct path of the upward movement of a thread-guide 89 on the outer end of the thread-guide arm 90, as shown in Figs. 14, 15 and 17. This thread-guide arm is pivotally supported to one side of the head 68 by a screw 91, and a stud 92 projects from its side in the direct path of a plunger 93 projecting from the forward end of the slide 77, with which it is adjustably connected by a set-screw 94 extending through the slot 95.

By the time the head 68 has approximately completed its three-quarters rotation in the formation of the loop, the plunger 93 has moved forward in the direction indicated by the arrow in Fig. 15, and its further movement from this point against the stud 92 causes the thread-guide arm 90 to swing on its axis 91 in the arc of a circle. The thread-guide 89 being immediately below the threads lifts and carries them over in a reverse direction (as shown in Fig. 17) drawing as much of the threads as required through the tension device, forming a further cross in the threads over the loop. As the thread-guide arm 90 continues on to the position shown in Fig. 16, due to the further forward movement of the plunger 93, a cam 96 on the inner face of the thread-guide arm by swinging against the projection 97 just below the notch 86 forces the knotter-hook 84 to the position shown in Fig. 18, which causes the outer end 98 of the hook 84 to gather in the threads laid between the hook and the fingers of the bill by the thread-guide 89 (see Fig. 17) and by the shearing action of the sharp edge 98 of the hook against the corresponding edge 99 of the bill, to cut the threads and at the same time to hold the ends temporarily, (see Fig. 18) until the end of the stripper 100 which has been sliding up between the fingers of the bill 83 beneath the loop 87 formed in the threads has stripped the latter from the knotter by rising still further to the outer end of the bill 83, as shown in Fig. 18. This stripper is connected by links 101 and 102 to a lever 103 fulcrumed at 104 which is lifted by the groove 106 on the back of the thread-guide arm 90 striking the pin 105 on the lever 103, as shown in Fig. 16. As this lever 103 continues to rise, a shoulder 107 thereon (see Fig. 13) by lifting the stem 108 projecting from the shaft 109 in its path (see Figs. 13, 16 and 19) causes the part round shaft 109 to rock from the position shown in Fig. 19, in which a portion of the spring tension 67 rests upon the flat face of the shaft to bring the rounded surface of the shaft against the tension device, whereby to raise the latter and release the bits of thread held by the tension after the severing of the thread on both sides thereof. These bits are blown out by a fan or blow-pipe (not shown) as fast as they are released.

A spring 110 returns the parts to normal, as shown in Figs. 13, 14 and 15. A spring 111 sleeved upon the rod 76 allows for the difference in motion between the rack-bar 75 and the slide 77.

Figure 1:
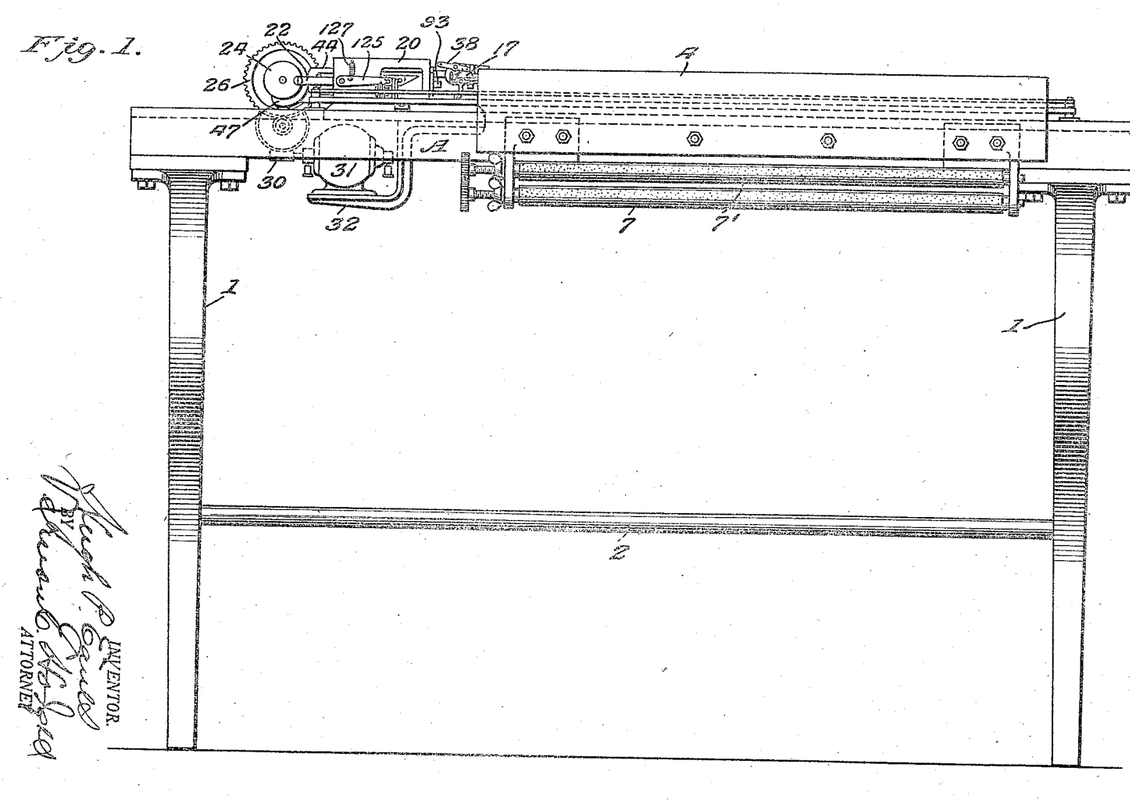
Fig. 1 is a view in side elevation.
Figure 2:
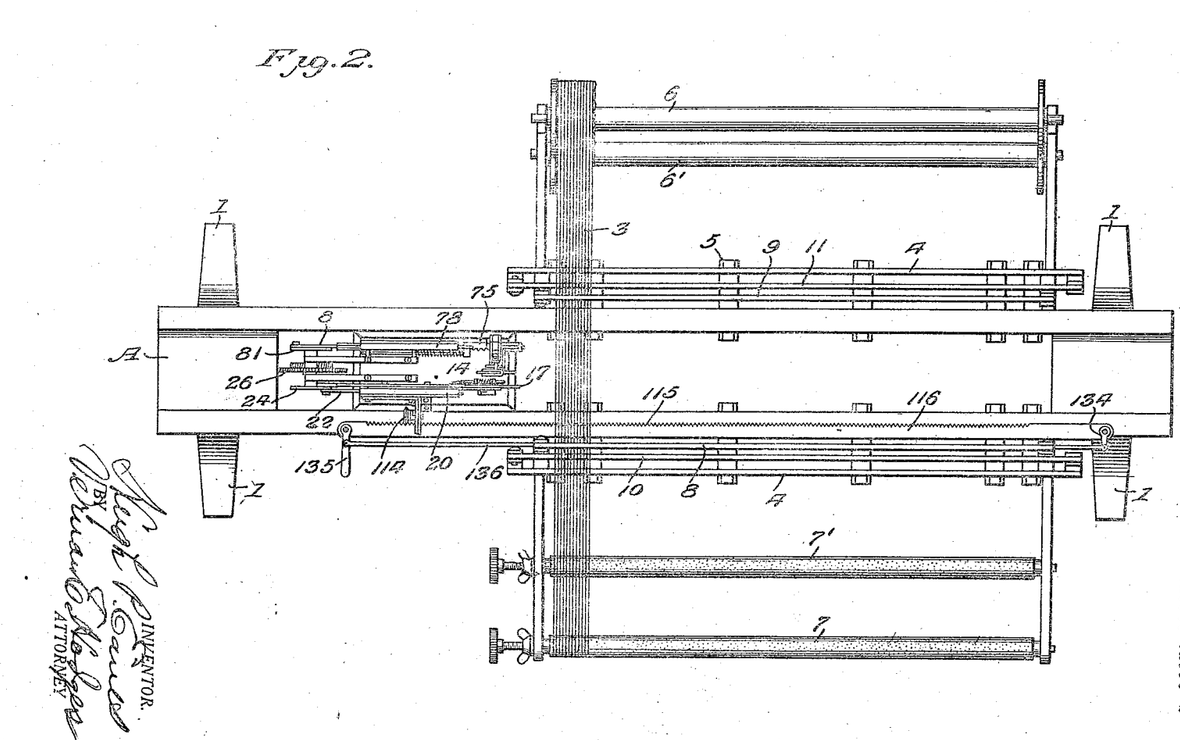
Fig. 2 is a plan view.

With each reciprocation of the selector 17, there is a progressive movement of the carriage 14 adjusted to and corresponding to the size of the thread or yarn being tied. While this may be accomplished in various ways, the means illustrated is well adapted to the purpose. A stub-shaft 112 is rotatably supported by the bearings in the bracket 113 bolted to one side of the carriage 14 as shown in Figs. 3, 4, 5, 11 and 20. On this stub-shaft 112, a worm-wheel 114 is keyed, and this worm engages and turns in contact with the teeth 115 on the bar 116 extending practically the entire length of the machine as shown in Fig. 2. On the hub of this worm, ratchet-teeth 117 are formed, and a gravity pawl 118 engages these teeth. This pawl is pivoted as at 120 to a lever 121, which latter in turn is pivoted by the pin 122 at the outer end of the bracket 113. The opposite end of the lever 121 has a fork 123 which straddles a pin 124 on the inner end of the lever 125, which latter is pivoted to the side of the frame 20 by screw 126, and normally held in an elevated position by the tension of spring 127 (see Figs. 5 and 20).

Figure 5:
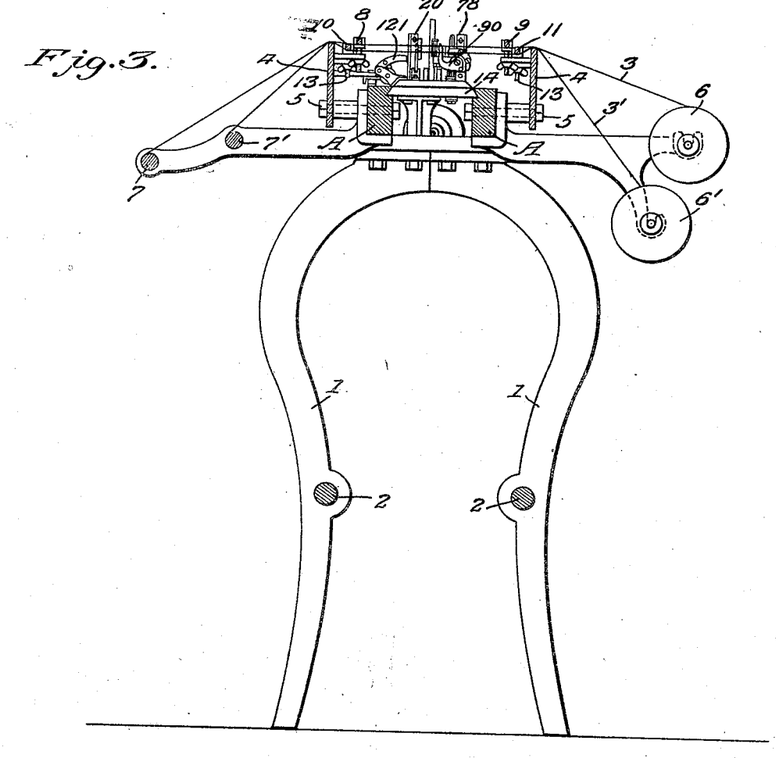
Fig. 5 is a plan view of the same.

The inner end of lever 125 carries roller 128 and this projects through a slot 129 in the side of the frame 20, in the path of a V-shaped cam 130 carried by the slide 19. The cam 130 is adjustable up and down by a set-screw 131 to give the required turn to the worm. This adjustment of the V-shaped cam 130 is required to determine and regulate the exact distance of the progressive, step by step, forward movement of the carriage with respect to the thickness of the yarn or thread being operated upon. With each reciprocation of the slide 19, the lever 125 is rocked, and with it the lever 121; and through a pawl 118 operating on the ratchet-teeth 117, the worm is turned just the required distance to bring the carriage forward to the right position for the selector on moving forward to gather in the first two adjacent threads for the knotter.

As a preliminary to the starting of the machine with a new rack full of yarn or threads, it is necessary to slide the entire carriage back by hand. Provision is made for this through the shifting of the toothed bar 106 bodily from the path of the worm 114. The rack 116 is mounted upon an eccentric 132 at each end of the rack. These eccentrics are on vertically disposed bearings 133. Levers 134 and 135 are secured to these eccentrics, as shown in Figs. 2, 5 and 11, the lever 135 being a hand-lever, and these levers are connected by a rod 136 (see Figs. 2, 5 and 11) so that when the operator wishes to push the carriage 14 back, or return it to normal (as illustrated in Fig. 2), he simply turns the hand-lever 135 to one side, thereby shifting the toothed bar 116 laterally from end to end through the medium of the eccentrics away from the worm 114. Then the carriage is slid by hand back to the starting-point, and the bar 116 is returned to the normal position shown in Figs. 2, 5, 11 and 20 by swinging the hand-lever back to the position illustrated in Figs. 2 and 5, which brings the worm 114 again into mesh with the teeth of the bar 116.

The movements are all properly timed. With each complete forward and backward stroke of the selector the entire carriage moves forward the width of the yarn or thread, so that when the selector reaches its extreme forward stroke, it is in position to receive the two nearest threads in the position shown in Fig. 7, ready to be gathered in by the selector-finger 35 on its upward movement. With the backward stroke, the threads are brought against the knotter, into the tension and against the side of the knotter, as shown in Fig. 20, whereupon the knotter makes its three-quarters turn, and the loop is formed about the bill and tying-hook, and the knot is formed, the threads are cut and held until the knot is stripped from the knotter, whereupon the severed bits of threads are released by both knotter and tension and blown out of the machine, and the operation is repeated until the entire rackful of yarn or threads is tied.

I claim:

1. A thread selecting device including means for guiding a plurality of threads, means for holding the threads within said guiding means, and means controlled by the threads within the guiding means for moving the holding means into engagement with the threads.

2. A thread selecting device including jaws for engaging and guiding threads, means for holding the threads in engagement with said jaws, and means controlled by the threads for moving the holding means into engagement with the threads.

3. A machine of the character described including a rotary head carrying a knotter and a tension device, a selector for choosing the threads and drawing them into the tension device and within reach of the knotter, means for cutting the threads, means for rotating the knotter to form a loop therearound, means for stripping the knot from the knotter to complete the formation of the knot, means for severing the threads at another point and holding them while the stripper is removing the loop from the knotter and completing the formation selector, trip-mechanism slidably connected therewith, a lever pivoted to the selector and to the selector-finger, a wish-bone slide slidably connected with the slide, carrying a cam which is controlled by the trip mechanism to cause it to actuate the lever or not accordingly as the trip is actuated by one or two threads, and common means for actuating the slide and wishbone slide at predetermined intervals.

15. A machine of the character described including a carriage, a slide-frame thereon, a slide movable in the frame, a rack-bar slidably connected with the slide and spring-actuated, a plunger adjustably connected with the slide, a rotary head having a pinion thereon engaged by the teeth of the rack-bar, and means for actuating the slide to rotate the head at predetermined intervals, a knotter carried by the head including bills, a knotter-hook, a thread-guide for guiding the thread and actuating the hook, the thread-guide having a stud in the path of the plunger whereby the guide is moved at a predetermined period by the contact of the plunger with the stud.

16. A machine of the character described including a carriage, a slide-frame thereon, a slide movable in the frame, a rack-bar slidably connected with the slide and spring-actuated, a plunger adjustably connected with the slide, a rotary head having a pinion thereon engaged by the teeth of the rack-bar, means for acutating the slide to rotate the head at predetermined intervals, a knotter carried by the head including bills, a knotter-hook, a thread-guide for guiding the thread and actuating the hook, the thread-guide having a stud in the path of the plunger whereby the guide is moved at a predetermined period by the contact of the plunger with the stud, a tension device carried by the head, and a lever actuated by the thread-guide for releasing the tension.

17. A machine of the character described including a carriage, a slide-frame thereon, a slide movable in the frame, a rack-bar slidably connected with the slide and spring-actuated, a plunger adjustably connected with the slide, a rotary head having a pinion thereon engaged by the teeth of the rack-bar, means for actuating the slide to rotate the head at predetermined intervals, a knotter carried by the head including bills, a knotter-hook, a thread guide for guiding the thread and actuating the hook, the thread-guide having a stud in the path of the plunger whereby the guide is moved at a predetermined period by the contact of the plunger with the stud, a tension device carried by the head, a lever actuated by the thread-guide for releasing the tension, the bills and hook constructed and adapted to sever the thread and hold it temporarily, a stripper moved by the lever for removing the loop forming the knot from the knotter whereby to complete the knot.

18. In a machine of the character described, the combination with a selector, of a cutting-blade and a stem pivoted thereto and to each other, means for moving the selector, and a stub in position to actuate the cutting-blade when the selector is moved in one direction.

19. A thread selecting device including jaws for guiding a plurality of threads, a finger for engaging the threads and holding them within the jaws, and means for actuating the finger.

20. A thread selecting device including jaws for guiding a plurality of threads, a finger connected with the jaws for engaging the threads and holding them within the jaws, means for actuating the finger, and means controlled by the threads for regulating the movement of said actuating means.

21. A thread selector having a selector-finger slidable therein and adapted to engage threads for holding them in engagement with the selector, and means controlled by the threads for actuating said selector-finger.

22. A thread-knotter including a rotatable bill adapted to form a loop in the threads, a tying-hook pivoted within the bill, a thread-guide adapted to draw the threads between the tying-hook and bill to be clamped thereby until the knot is formed, and means for stripping the loop from the bill for forming the knot, said tying-hook having a shearing surface for severing the threads.

In testimony whereof I affix my signature.

HUGH P. EANES.